(12) United States Patent
Hsu et al.

(10) Patent No.: US 6,732,603 B1
(45) Date of Patent: May 11, 2004

(54) PHASE ROTARY DISK MOTOR SWITCHING MODULE (75) Inventors: Hsueh-Chou Hsu, Kaohsiung (TW); Chi-Chien Lin, Hsinchu Hsien (TW)

(73) Assignee: Lite-On Technology, Taipei (TW)

( * ) Notice: Subject to any disclaimer, the term of this patent is extended or adjusted under 35 U.S.C. 154(b) by 0 days.

(21) Appl. No.: 10/299,702

(22) Filed: Nov. 20, 2002

(51) Int. Cl.[7] ................................................. F16H 3/20
(52) U.S. Cl. ....................... 74/354; 475/12; 74/665 GA
(58) Field of Search ........................ 74/353, 354, 665 F, 74/665 GA; 475/12

(56) References Cited

U.S. PATENT DOCUMENTS

| 4,667,934 | A | * | 5/1987 | Ottemann ................. 254/344 |
| 4,717,364 | A | * | 1/1988 | Furukawa .................. 446/175 |
| 5,365,301 | A | * | 11/1994 | Sugita et al. ................. 396/144 |
| 5,896,774 | A | * | 4/1999 | Funahashi et al. ............ 74/353 |
| 5,970,286 | A | | 10/1999 | Numazu et al. |
| 6,164,844 | A | * | 12/2000 | Okumura et al. ........... 396/447 |
| 6,175,666 | B1 | | 1/2001 | Yoshida |
| 6,189,395 | B1 | | 2/2001 | Lee |
| 6,367,994 | B2 | | 4/2002 | Oshima et al. |

FOREIGN PATENT DOCUMENTS

JP          357154547      *  9/1982  ................. 74/354

* cited by examiner

Primary Examiner—Ha Ho
(74) Attorney, Agent, or Firm—Birch, Stewart, Kolasch & Birch, LLP (57) ABSTRACT A phase rotary disk motor switching module employs anchor notches located on the peripheral rim of a rotary disk mounted on a motor to couple with a retaining element to enable the rotary disk to rotate in only one direction and define a plurality of phases for the rotary disk. Every phase has a driven gear coupled with the motor for transmitting output power. Motor power may be switched to a plurality of phases of output positions to maximize utilization of a single motor.

9 Claims, 11 Drawing Sheets

PHASE ROTARY DISK MOTOR SWITCHING MODULE

FIELD OF THE INVENTION

The invention relates to a motor switching apparatus installed on a motor for use in equipment that requires multiple power outputs, such as multi-function printers (MFPs), and particularly a motor switching module that employs a rotary disk to switch phases.

BACKGROUND OF THE INVENTION

Nowadays office machines such as copiers, printers, facsimile machines and scanners are indispensable information equipment in the office environment. All business and administrative tasks are closely tied to these machines. Each office machine occupies a site. Adding it all together, they take a lot of space and become a great burden to the work environment that has spatial constraints. In addition, each office machine has different functions. Utilization frequency of these single function office machines is also different. Some office machines are not frequently used. But in order to meet business requirements, they still have to be procured and installed.

In order to remedy the problems set forth above, Multi-Function Peripherals (MFPs) have been developed and introduced. These MFPs integrate the functions of copying, printing, facsimile and scanning. Users can process a wide range of office tasks by procuring only one MFP. As a result, a large amount of space and cost is saved. Moreover, the MFP often provides a simple operation interface and becomes an All-in-one device.

A conventional MFP generally has a scanner device located on the upper side to process scanning operations. Coupled with the setting of the microprocessor and communication lines, it also can perform facsimile functions after the scanning operation is done. The machine further has a printing device located therein. There is a paper-feeding device located on one side of the machine. With the printing device and the paper-feeding device coupled together, printing operations may be performed. Thus the motion mechanism of the MFP includes at least devices for scanning, printing and paper feeding. The scanner device includes a CCD to be moved reciprocally, a transmission belt engaged with the CCD, and a driving motor coupled with the transmission belt to provide rotation power. The printing device may be an inkjet or laser printer using carbon powders driven by a motor. The inkjet device includes a carrier that holds the ink cartridge and moves reciprocally, a transmission belt engaged with the carrier, and a driving motor coupled with the transmission belt to provide rotation power. The paper-feeding device includes a rotary paper feeding barrel, a transmission gear set engaging with a paper feeding axle, and a driving motor engaged with the transmission gear set to provide rotation power.

In the aforesaid MFP, the devices and the driving motors are coupled in an one-on-one fashion. The rotation power required by one device is provided by one driving motor. Such a design merely puts one scanner and one inkjet printer in a machine. While the electronic circuits are integrated, in terms of their mechanisms, each device still operates independently. Hence they are not truly integrated. The number of the driving motors is not reduced, and the driving motors take a significant portion of the cost and occupy a great amount of space in the machine.

SUMMARY OF THE INVENTION

The primary object of the invention is to resolve the problems set forth above. The invention provides a phase rotary disk motor switching module to optimize the utilization of motor power and enable a single motor to provide multiple power output.

The phase rotary disk motor switching module of the invention consists of a rotary disk, an output gear, a retaining element, a plurality of phase gears and a plurality of driven gears corresponding to the phase gears. The rotary disk is coupled to a motor. The motor has a power output shaft coupled with a driving gear. The phase gears are located on the periphery of the rotary disk and are coupled with the driving motor. The peripheral rim of the rotary disk has a plurality of anchor notches. The retaining element may latch on one of the anchor notches to enable the rotary disk to define a plurality of corresponding phases. Each phase has an adjacent driven gear coupled with one phase gear. Thus motor power may be transmitted through the driving gear, phase gears and driven gears and output to provide a plurality of power output phases.

When the motor rotates in the positive direction, it drives the rotary disk and enables the retaining element to selectively switch to various phases. When the motor rotates in the reverse direction, the rotary disk is prevented from turning due to the restriction of the retaining element. Meanwhile, the driving gear may be driven by the motor to transmit power through the phase gear on a selected phase to the coupled driven gear.

The foregoing, as well as additional objects, features and advantages of the invention will be more readily apparent from the following detailed description, which proceeds with reference to the accompanying drawings.

DESCRIPTION OF THE PREFERRED EMBODIMENT

Figure 1A:
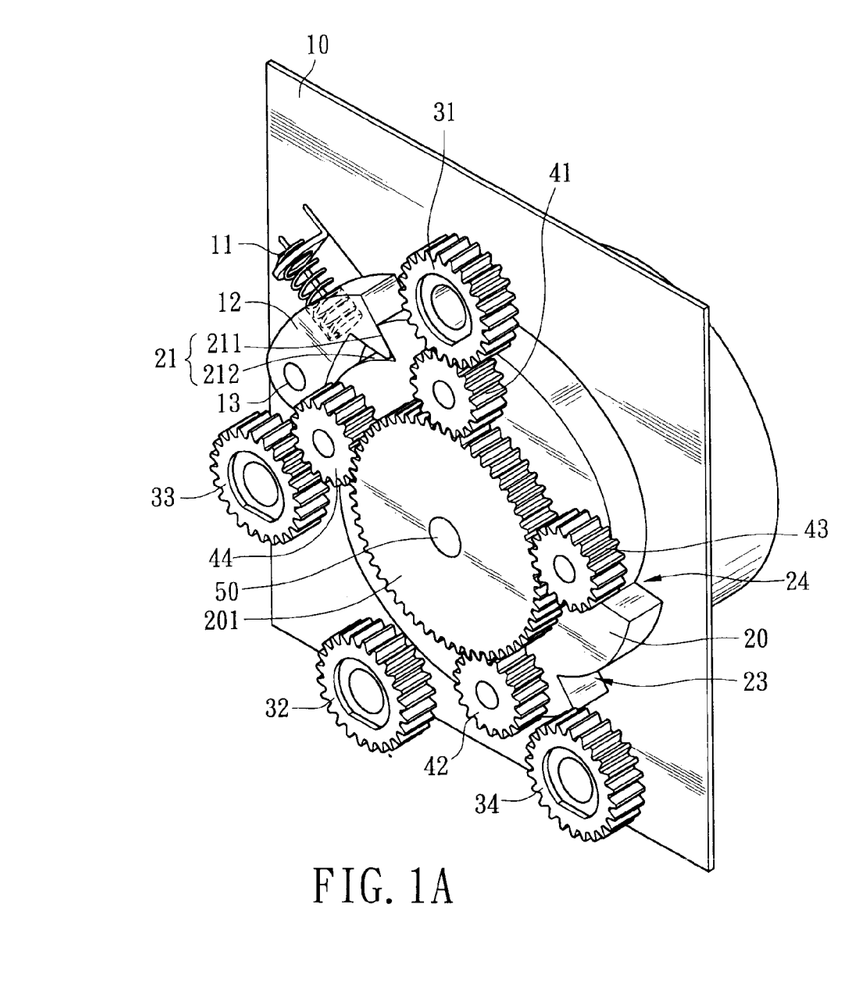
FIGS. 1A–1C are schematic views of the invention.
Figure 1B:
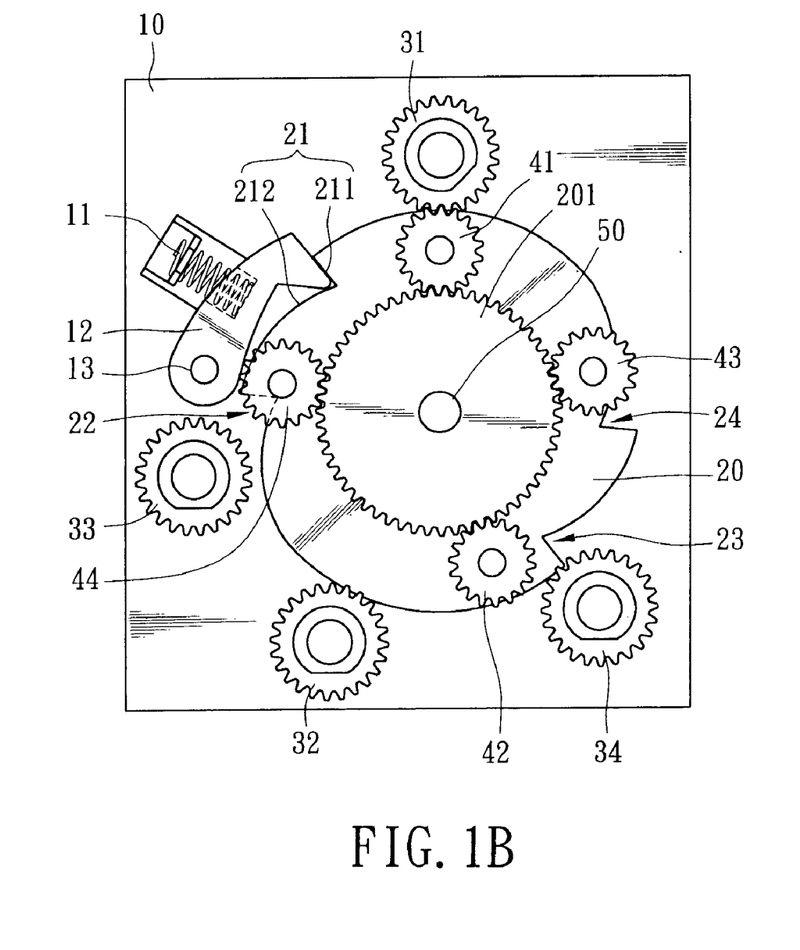
Figure 1C:
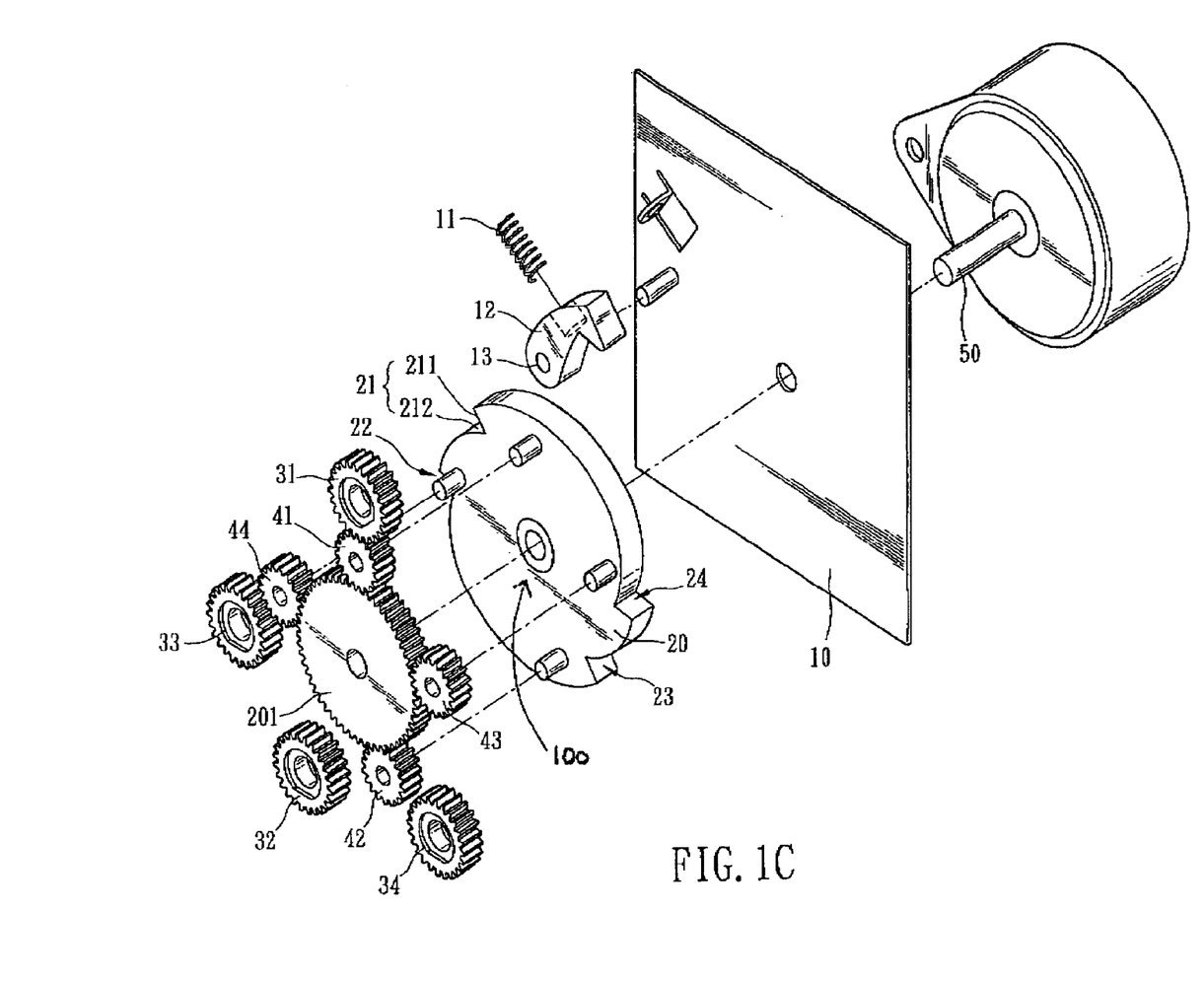

Referring to FIGS. 1A, 1B and 1C, the phase rotary disk motor switching module of the invention consists of a mounting board 10, a rotary disk 20, a retaining element 12 and a plurality of gear sets. The mounting board 10 has a back side with a motor mounted thereon (not shown in the drawings). The motor has a power output shaft 50 extending to the front side of the mount board. The rotary disk 20 is mounted on the power output shaft 50. The power output shaft 50 is coupled with a driving gear 201 for transmitting motor power. Of course, other types of gear sets may also be used to transmit the motor power.

The peripheral rim of the driving gear 201 couples with a plurality of phase gears which include a first phase gear 41, a second phase gear 42, a third phase gear 43 and a fourth phase gear 44. The peripheral rim of the rotary disk 20 has a plurality of anchor notches which include a first anchor notch 21, a second anchor notch 22, a third notch 23 and a fourth anchor notch 24. The retaining element 12 is located at one side of the rotary disk 20 and is pivotally engaged with the mounting board 10 by means of a pintle 13 to enable the retaining element 12 to swing radially towards the rotary disk 20 to selectively latch on one of the anchor notches. When the retaining element 12 latches on the anchor notch, the rotary disk 20 can rotate only in one direction (such as the clockwise direction shown in the drawings) due to the restriction of the retaining element 12. When the retaining element 12 latches onto different anchor notches, the rotary disk 20 defines different phases, i.e. the first, second, third and fourth anchor notches correspond respectively to the first, second, third and fourth phase states.

Figure 2A:
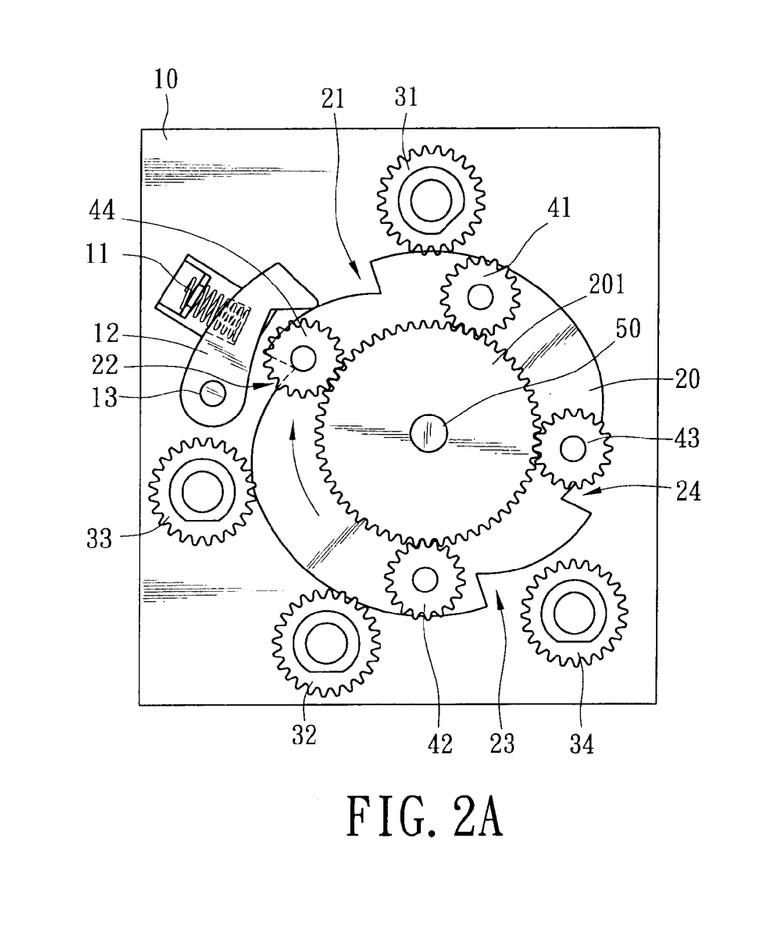
FIGS. 2A–2B are schematic views of the invention in movements for phase switching.
Figure 2B:
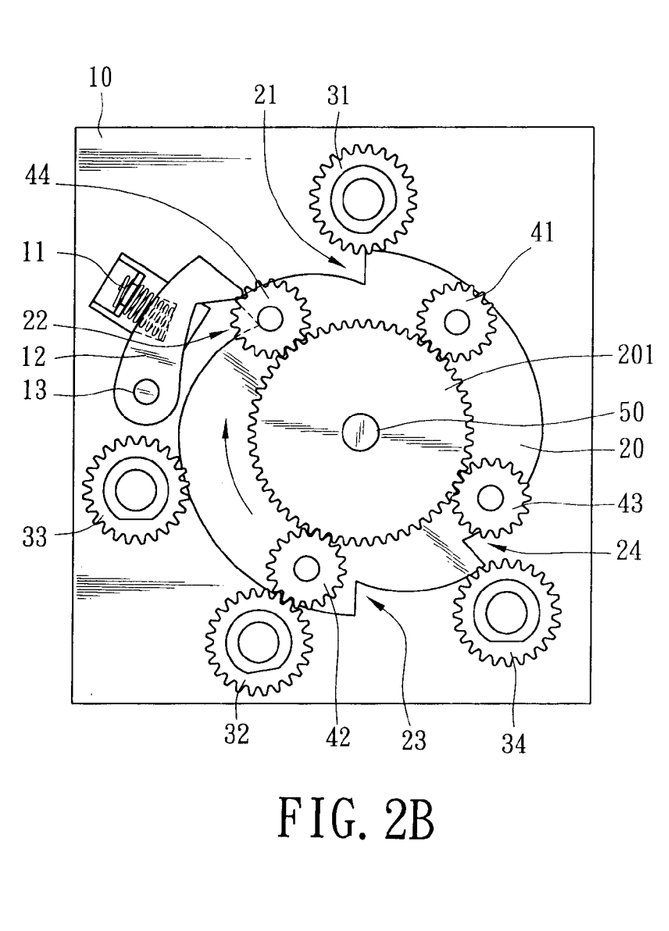

When the motor rotates in the positive direction (clockwise direction), it also drives the rotary disk 20 to rotate in the clockwise direction. Because the anchor notches have stopping and guiding functions, the retaining element 12 may be switched to different phases. The first anchor notch 21 is taken as an example to explain the phase switching operation as follows. The first phase notch 21 has a stop section 211 substantially parallel with the radial direction of the rotary disk 20 and a slide section 212 connecting to the stop section 211. The retaining element 12 has a front end parallel with the stop section 211 and formed in a shape to match the stop section 211. Thus the retaining element 12 may contact the stop section 211 of the first notch 21 and maintain contact through an elastic element, which has two ends located respectively on the mounting board 10 and the retaining element 12 so that the rotary disk 20 is prevented from turning counterclockwise. While the drawings show that the elastic element is a spring 11, it is by no means limited to this. The slide section 212 is a smooth curve. When the rotary disk 20 rotates in the clockwise direction, it guides the retaining element 12 to swing outwards about the pintle 13 as shown in FIG. 2A. When the rotary disk 20 is driven by the motor to rotate continuously, the retaining element 12 slides along the slide section 212 of the first anchor notch 21 until it moves away from the first anchor notch 21 (as shown in FIG. 2B).

Figure 3A:
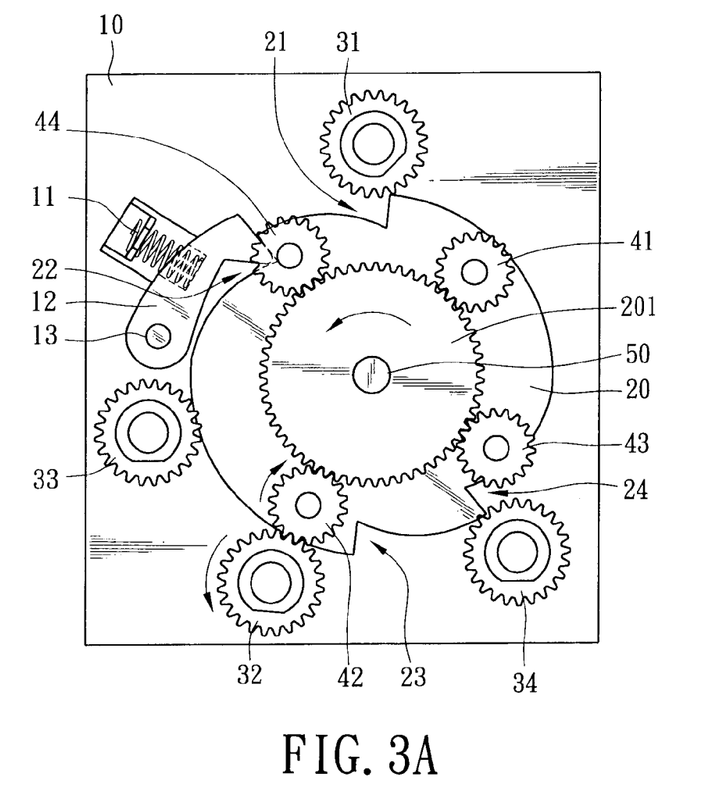
FIG. 3A is a schematic view of the invention in the second phase.
Figure 3B:
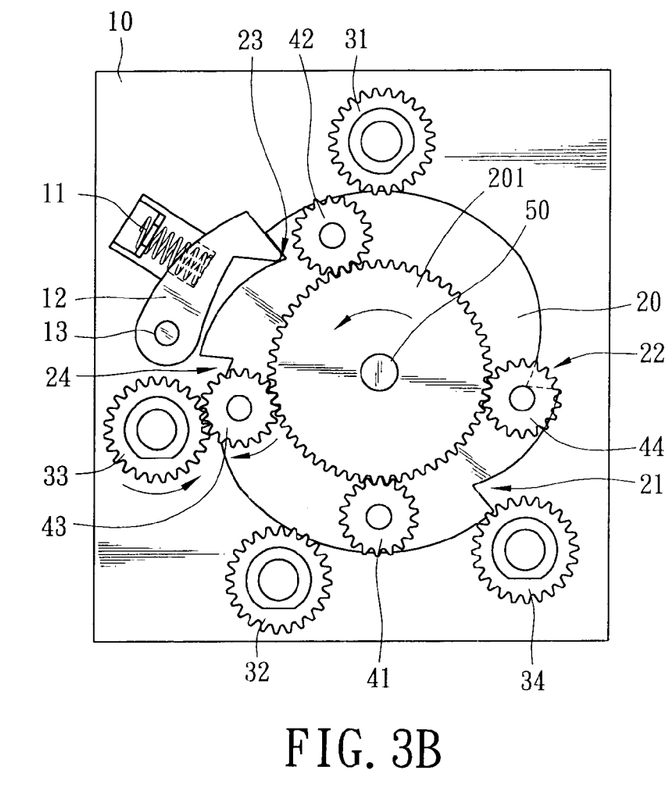
FIG. 3B is a schematic view of the invention in the third phase.
Figure 3C:
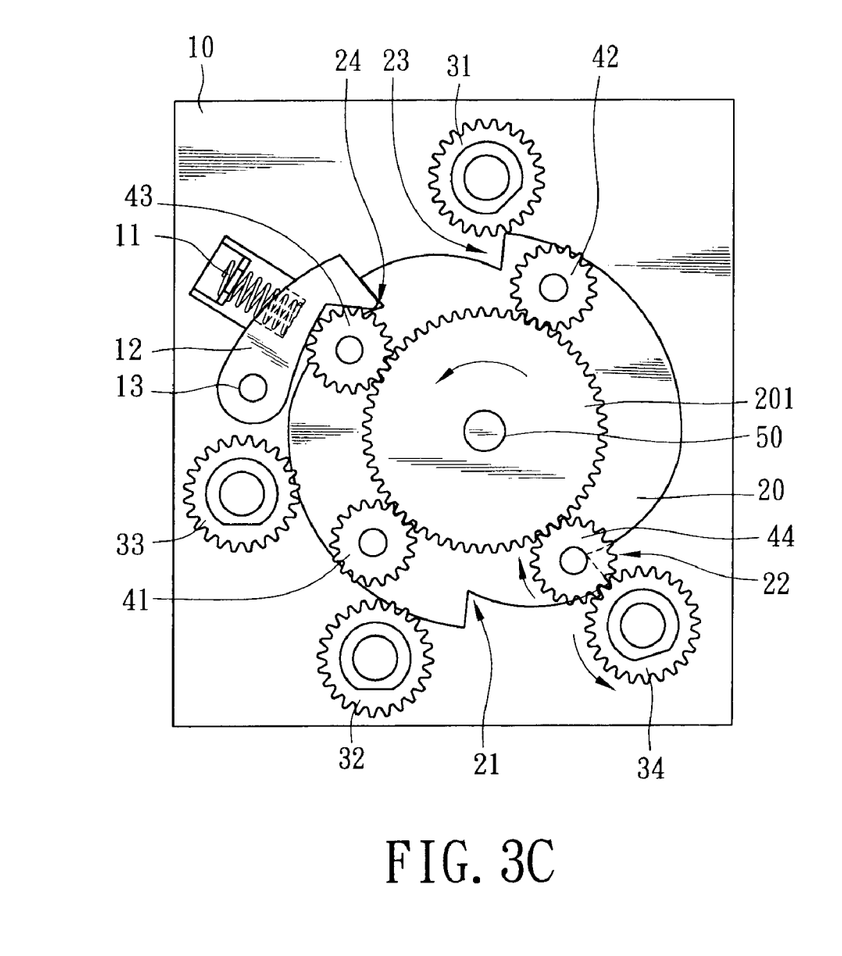
FIG. 3C is a schematic view of the invention in the fourth phase.

When the rotary disk 20 rotates clockwise continuously, the retaining element 12 moves continuously to stop at the second anchor notch 22, the third anchor notch 23 and the fourth anchor notch 24, and enables the rotary disk 20 be positioned sequentially at the second phase, the third phase and the fourth phase (referring to FIGS. 3A–3C). At each phase, there is a phase gear coupling with a driven gear. For the first phase to the fourth phase, the first phase gear 41, the second phase gear 42, the third phase gear 43 and the fourth phase gear 44 couple with the first driven gear 31, the second driven gear 32, the third driven gear 33 and the fourth driven gear 34 (referring to FIGS. 1C, 3A, 3B and 3C). In the mean time, the motor power output shaft 50 rotates in a counter-clockwise (or reverse) direction. As the rotary disk 20 is prevented from turning due to the restriction of the retaining element 12, the driving gear 201 may transmit motor output power through the phase gear to the driven gear. Taken the fourth phase for example. As shown in FIG. 3C, the driving gear 201 engages with the fourth phase gear 44, which in turn engages with the fourth driven gear 34, hence motor power may be transmitted through the driving gear 201, fourth phase gear 44 and fourth driven gear 34 to a device coupled with the fourth driven gear 34 to provide power required in the device. Similar operation principles may be applied to other three phases. Thus the power of a single motor can be transmitted to four different phases (or four devices).

On the other hand, in order to prevent the rotary disk 20 from turning counterclockwise during phase switching and resulting in the driving gear 201 transmitting power through the phase gear to the coupled driven gear and making wrong movements, the driving gear 201 may be coupled with a one-way bearing located at 100 to mount on the motor power output shaft. This can prevent faulty operations from occurring. Of course, the number of the phase is not limited to four. It may be more or less according to requirements.

Figure 4:
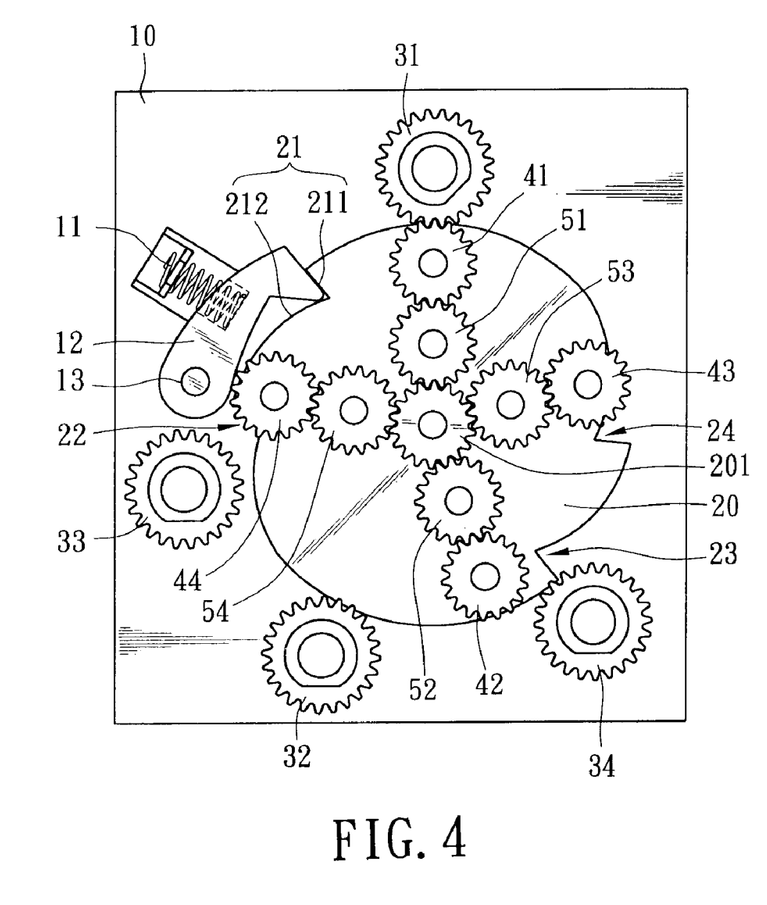
FIG. 4 is a schematic view of the invention with added gears.
Figure 5:
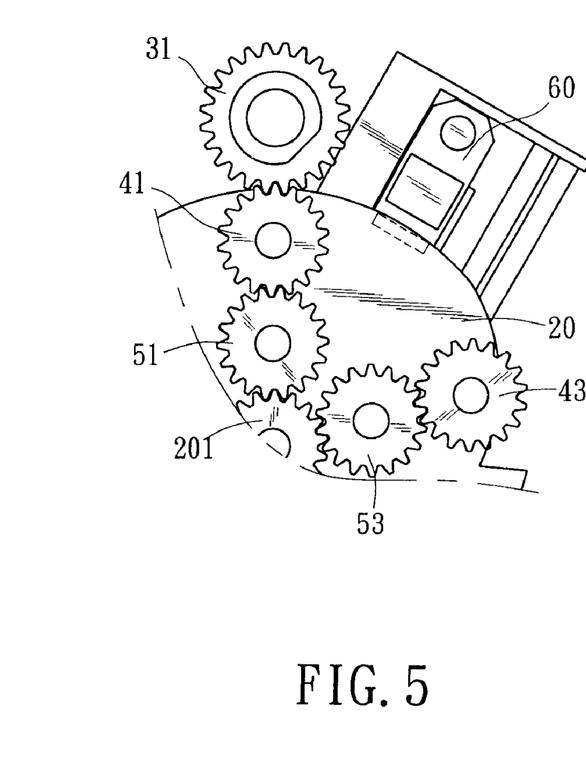
FIG. 5 is a schematic view of the invention with an added positioning sensor.

By means of the arrangement set forth above, the rotation speed and direction of every driven gear are the same. However, such a design does not necessary meet all the requirements. Hence based on different requirements, a plurality of gear sets may be added to the driven gears to change and control the rotation speed and direction. To achieve this purpose, gears may be added between each phase gear and the driving gear 201. Referring to FIG. 4, a first gear 51, a second gear 52, a third gear 53 and a fourth gear 54 are added respectively to the first phase gear 41, second phase gear 42, third phase gear 43 and fourth phase gear 44 to control the speed reducing ratio. Furthermore, in order to ensure that the rotary disk 20 is anchored on the desired phase after having stopped for a period of time and to prevent faulty operations, a positioning sensor 60 may be installed at one side of the rotary disk 20 to monitor and control the phase of the rotary disk 20.

Figure 6A:
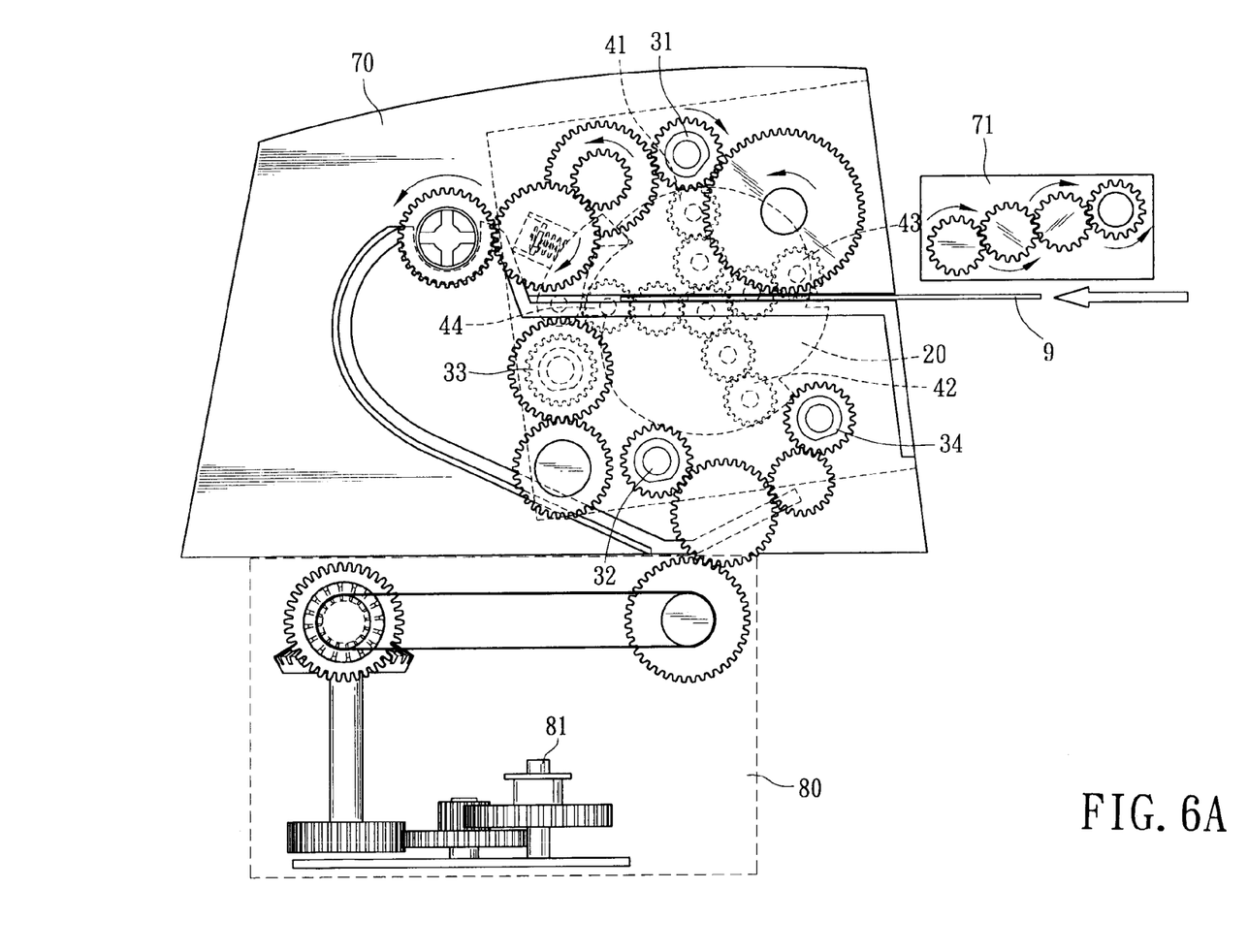
FIGS. 6A and 6B are schematic views of the invention adopted on an MFP for feeding paper.
Figure 6B:
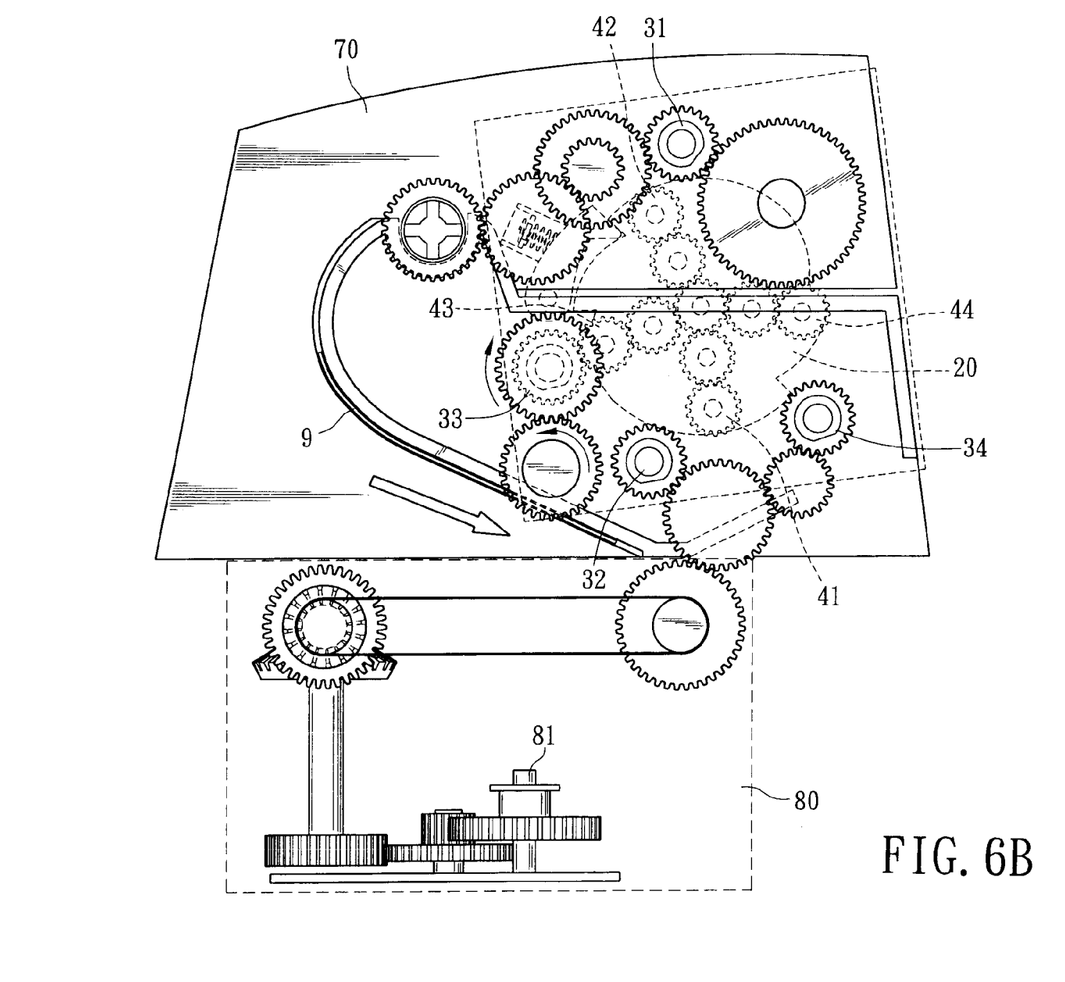

Refer to FIGS. 6A and 6B for an embodiment of the invention adopted on an MFP. The first driven gear 31 and the third driven gear 33 are used on a paper-feeding system 70, while the second driven gear 32 and the fourth driven gear 34 are used on a scanner system 80. First, the rotary disk 20 is switched to the first phase (as shown in FIG. 6A), and the first driven gear 31 is coupled with a plurality of gear sets to feed paper 9 from a paper cartridge 71 into the paper-feeding system 70. Then the rotary disk 20 is switched to the third phase. By the driving of the third driven gear 33, paper 9 is turned and fed into the scanner system 80 (shown in FIG. 6B).

Figure 7A:
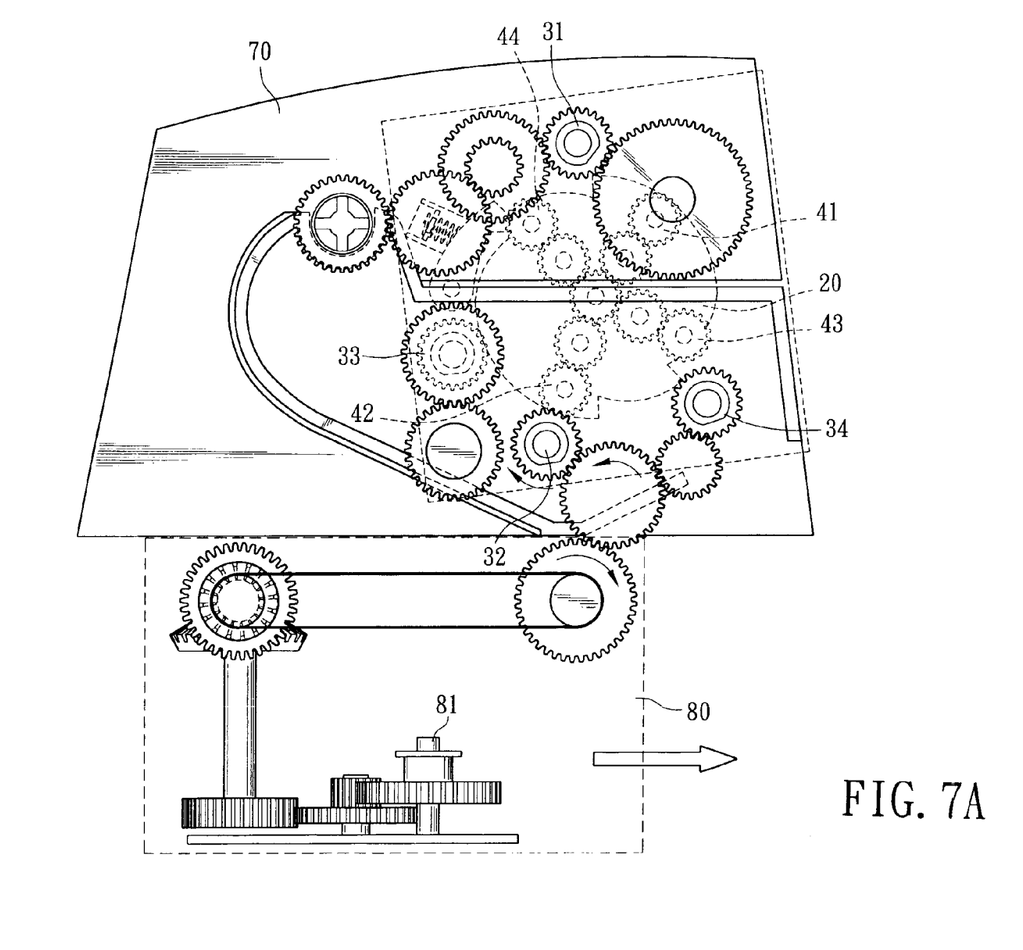
FIGS. 7A and 7B are schematic views of the invention adopted on an MFP for driving a CCD to perform scanning operations.
Figure 7B:
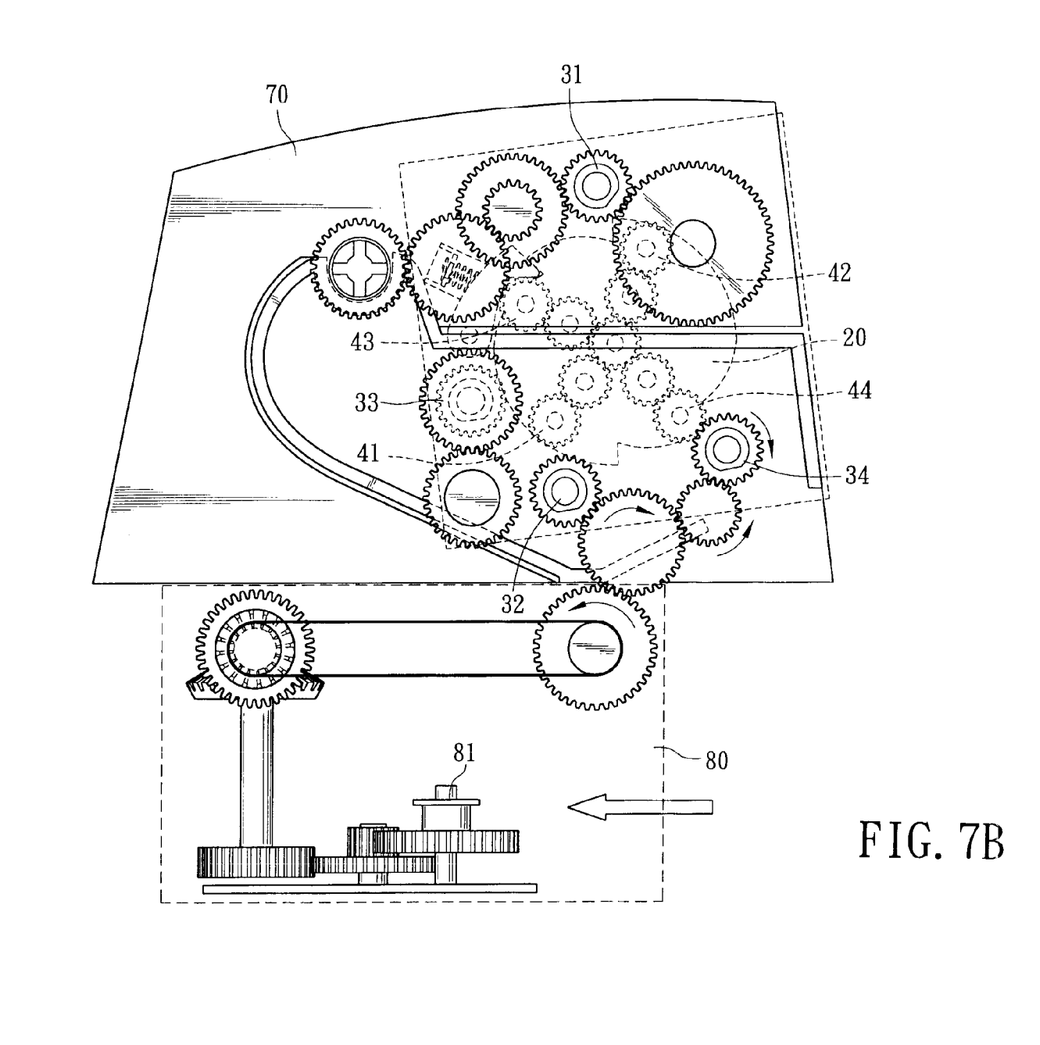

Next, the rotary disk 20 is switched to the second phase or the fourth phase (referring to FIGS. 7A and 7B). By coupling the second driven gear 32 or the fourth driven gear 34 with the scanner system 80, and through a plurality of gear sets, power may be transmitted to a CCD 81, and through different phases of the rotary disk 20. Thus the CCD 81 may be moved reciprocally to perform the scanning operation. Therefore the two systems that require motors (the paper feeding-system and scanner system) may be integrated and served by one single motor. Of course, applications of the invention are not limited to MFPs or scanner and paper feeding systems. Any equipment that requires multiple motor output may be integrated through the invention.

In summary, the phase rotary disk motor switching module of the invention employs anchor notches on the peripheral rim of a rotary disk to couple with a retaining element to define a plurality of phases. Every phase has a corresponding phase gear to couple with an adjacent driven gear to transmit output power. Thus by the switching of the rotary disk, motor power may be transmitted through different positions to maximize the utilization of one single motor.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A phase rotary disk motor switching module adopted on a motor for switching motor power to different phases to output, comprising:

a rotary disk coupled with a power output shaft of the motor and driven by the motor for rotating and having a plurality of anchor notches located on the peripheral rim of the rotary disk for defining a plurality of corresponding phases for the rotary disk;

a retain element located at one side of the rotary disk for latching on one of the anchor notches to restrict the rotary disk to rotate if only one direction;

a plurality of phase gears mounted on the peripheral rim of the rotary disk to be driven by the motor for transmitting the motor power; and a plurality of driven gears located around the rotary disk corresponding to the phases of the rotary disk such that each of the phase gears being coupled with one driven gear at one corresponding phase;

the rotary disk being driven by the motor to rotate such that the retain element is selectively latched on one of the anchor notches, and the phase of the rotary disk is switched, and the motor power is transmitted through the corresponding phase gear to the coupled driven gear when the motor rotates reversely, the rotary disk further comprising a driving gear mounted thereon to receive output power of the motor, the driving gear being coupled with the phase gears for transmitting the motor power to the phase gears, the driving gear being mounted on a one-way bearing for coupling with the power output shaft to restrict the rotation direction of the driving gear and to prevent the phase gears from being driven to rotate when the motor rotates in the positive direction.

2. The phase rotary disk motor switching module of claim 1, wherein the driving gear is directly mounted on the power output shaft of the motor.

3. The phase rotary disk motor switching module of claim 1, wherein the driving gear is coupled with the power output shaft of the motor and outputs power through gear sets.

4. The phase rotary disk motor switching module of claim 1, wherein each of the phase gears couple with the driving gear through a gear.

5. The phase rotary disk motor switching module of claim 1, wherein each of the anchor notches includes a stop section substantially parallel with the radial direction of the rotary disk and a slide section connecting to the stop section, the stop section being latched on the retain element for restricting the rotating direction of the rotary disk, the slide section guiding the retain element to move away from the anchor notch when the motor rotates in the positive direction.

6. The phase rotary disk motor switching module of claim 5, wherein the retain element has a front end parallel with the stop section to latch and stop the stop section.

7. The phase rotary disk motor switching module of claim 1, wherein the retain element further connects to an elastic element which keeps the retain element to latch on the anchor notch in normal conditions.

8. The phase rotary disk motor switching module of claim 7, wherein the elastic element is a spring.

9. The phase rotary disk motor switching module of claim 1 further having a positioning sensor located at one side of the rotary disk for detecting the phase of the rotary disk.

* * * * *